United States Patent
Lewis et al.

(10) Patent No.: US 10,259,255 B2
(45) Date of Patent: Apr. 16, 2019

(54) SECURITY PRINTING

(71) Applicants: Inovink Limited, Sheffield (GB); Keeling & Walker Limited, Stoke-on-Trent (GB)

(72) Inventors: David Malcolm Lewis, Otley (GB); Dieter Guhl, Stoke-on-Trent (GB)

(73) Assignees: Inovink Limited, Sheffield (GB); Keeling & Walker Limited, Stoke-on-Trent (GB)

( * ) Notice: Subject to any disclaimer, the term of this patent is extended or adjusted under 35 U.S.C. 154(b) by 0 days.

(21) Appl. No.: 15/053,668

(22) Filed: Feb. 25, 2016

(65) Prior Publication Data
US 2016/0243877 A1    Aug. 25, 2016

(30) Foreign Application Priority Data

Feb. 25, 2015   (GB) .................................. 1503178.4

(51) Int. Cl.
| | |
|---|---|
| *B42D 25/382* | (2014.01) |
| *D21H 17/63* | (2006.01) |
| *B42D 25/29* | (2014.01) |
| *B41M 3/14* | (2006.01) |
| *C09D 11/037* | (2014.01) |
| *D21H 21/48* | (2006.01) |
| *G06K 19/10* | (2006.01) |
| *C09D 5/24* | (2006.01) |
| *H01B 1/08* | (2006.01) |

(52) U.S. Cl.
CPC ............. *B42D 25/382* (2014.10); *B41M 3/14* (2013.01); *B42D 25/29* (2014.10); *C09D 11/037* (2013.01); *D21H 17/63* (2013.01); *D21H 21/48* (2013.01); *G06K 19/10* (2013.01); *C09D 5/24* (2013.01); *H01B 1/08* (2013.01)

(58) Field of Classification Search
CPC ...... B42D 25/382; B42D 25/29; D21H 17/63; D21H 21/48; B41M 3/14; C09D 11/037; C09D 5/24; G06K 19/10; H01B 1/08
USPC ....... 283/70, 72, 74, 91, 94, 95, 96, 98, 901
See application file for complete search history.

(56) References Cited

U.S. PATENT DOCUMENTS

| | | | |
|---|---|---|---|
| 4,655,966 A | | 4/1987 | Guillaumon et al. |
| 2010/0084852 A1* | | 4/2010 | Hampden-Smith ......................... C09D 11/322 283/92 |
| 2012/0107491 A1 | | 5/2012 | Li et al. |
| 2012/0293790 A1 | | 11/2012 | Frankenberger et al. |
| 2015/0118458 A1 | | 4/2015 | Kobayashi et al. |

(Continued)

FOREIGN PATENT DOCUMENTS

| | | |
|---|---|---|
| EP | 2284019 | 2/2011 |
| GB | 2438196 | 11/2007 |
| JP | 2010006999 | 1/2010 |

(Continued)

OTHER PUBLICATIONS

Great Britain application No. GB1602748.4 search and examination report dated Jun. 24, 2016, 9 pages.

(Continued)

*Primary Examiner* — Justin V Lewis
(74) *Attorney, Agent, or Firm* — Hoffman Warnick LLC

(57) ABSTRACT

An article comprising a substrate which carries a doped tin oxide wherein less than 50 mol % of the tin atoms in the tin oxide are substituted with a dopant element.

7 Claims, 9 Drawing Sheets

(56) References Cited

U.S. PATENT DOCUMENTS

2016/0075163 A1\* 3/2016 Stock .................. B41M 3/144
283/72
2016/0137863 A1 5/2016 Greisiger et al.

FOREIGN PATENT DOCUMENTS

| JP | 2010084079 | 4/2010 | | |
|---|---|---|---|---|
| JP | 2010234595 | 10/2010 | | |
| JP | 2011225782 | 11/2011 | | |
| WO | 2007044106 A1 | 4/2007 | | |
| WO | WO 2014180557 A1 \* | 11/2014 | ............ | B41M 3/144 |
| WO | 2015/068290 A1 | 5/2015 | | |
| WO | 2015068292 | 5/2015 | | |

OTHER PUBLICATIONS

PCT application No. PCT/GB2016/050384 International search report and written opinion dated Jul. 13, 2016, 15 pages.
Dagkaldiran et al., "Amorphous silicon solar cells made with Sn02:FTCO films deposited by atmospheric pressure CVD", Materials Science and Engineering B, Elsevier, 2009, 4 pages.
Sheel et al., "Atmospheric pressure chemical vapour deposition of F doped Sn02 for optimum performace solar cells", Thin Solid Films, Elsevier, 2009, 5 pages.

\* cited by examiner

SECURITY PRINTING

CROSS-REFERENCE TO RELATED APPLICATIONS

This application claims the benefit of UK patent application GB1503178.4, filed 25 Feb. 2015, which is hereby incorporated herein.

The present invention relates to articles comprising a security feature and compositions and methods relating thereto.

The invention relates in particular to banknotes and to the use of infra-red absorbing pigments as a security feature on the banknotes.

According to a first aspect of the present invention there is provided an article comprising a substrate which carries a doped tin oxide wherein less than 50 mol % of the tin atoms in the tin oxide are substituted with a dopant element.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
FIG. 1 shows the infrared spectrum of an antimony doped tin oxide powder comprising 5 mol % antimony.

The present invention relates to an article comprising a substrate which carries a doped tin oxide.

The article may be selected from packaging, for example for pharmaceuticals; a label, for example for expensive or designer goods; an identification document, for example a passport, ID card or driving licence; a credit card or other bank card; a ticket or voucher, for example for events or travel; or a certificate, for example a share certificate or stamp certificate.

Most preferably the article is a banknote.

The article comprises a substrate. Preferably the substrate is a sheet substrate, preferably a planar sheet substrate. The substrate may be made from any suitable material. Suitable materials will be known to the person skilled in the art and include for example paper, cardboard, textiles and plastics materials.

In preferred embodiments in which the article is a banknote the substrate is selected from paper, a polymer or a mixture thereof. A preferred paper is banknote paper and a preferred polymer is biaxially oriented polypropylene. Other suitable papers and polymers will be known to the person skilled in the art.

The substrate carries a doped tin oxide. By this we mean that the tin oxide is retained within or on the surface of the substrate. In some embodiments the tin oxide may be held within the body of the substrate, for example dispersed throughout the substrate. For example it may have been mixed within the raw ingredients used to make the substrate. In some embodiments the doped tin oxide may be incorporated in a thread woven into the substrate. In some embodiments the doped tin oxide may be in a coating on some or all of the substrate, on one or both planar surfaces of the substrate. In some embodiments the doped tin oxide may have been printed onto the substrate, on one or both planar surfaces of the substrate. In some embodiments the doped tin oxide may be incorporated only into one portion of the substrate. For example where a banknote includes a window, for example of a substantially transparent polymer, the doped tin oxide may only be present on the window portion or the non window portion.

Preferably the doped tin oxide is carried on the surface of the substrate. It may be present as a coating or a printed image. Suitably it may be printed in the form of a security image.

Suitably the doped tin oxide is derived from a cassiterite form of tin oxide.

In the doped tin oxide less than 50 mol % of the tin atoms are substituted with a dopant.

Preferably at least 0.1 mol % of the tin atoms are substituted with a dopant, preferably at least 0.5 mol %, more preferably at least 1 mol %.

Suitably up to 40 mol % of the tin atoms are substituted with a dopant, preferably up to 30 mol %, more preferably up to 25 mol %.

The level of dopant in the tin oxide will depend on a number of factors including the nature of the dopant(s), the concentration at which the tin oxide is to be used, the nature of the substrate and the desired conductivity and IR absorption characteristics.

In preferred embodiments the dopant is present in a concentration of from 2 to 20 mol %, preferably 3 to 15 mol %.

The tin oxide is suitably doped with one or more elements selected from antimony, tungsten, phosphorus, copper, niobium, manganese, fluorine and nickel.

Preferably the tin oxide is doped with one or more elements selected from antimony, tungsten and phosphorous.

Most preferably the tin oxide is doped with antimony.

In some preferred embodiments the tin oxide is doped only with antimony. In such embodiments the antimony is present in an amount of from 0.5 to 20 mol %, preferably 2 to 18%, more preferably 5 to 15 mol %.

In some embodiments the tin oxide is doped with antimony and tungsten. In such embodiments antimony is preferably present in an amount of from 6 to 10, preferably 7 to 9, for example about 8 mol % and tungsten is present in an amount of from 1 to 5, preferably 2 to 4, for example about 3 mol %.

In some embodiments the tin oxide is doped with antimony and phosphorus. In such embodiments phosphorous is preferably present in an amount of from 1 to 5, preferably from 2 to 4, for example about 3 mol %, and antimony is present in an amount of from 5 to 10, preferably 7 to 9, for example about 8 mol %.

In some embodiments the doped tin oxide is present in a coating on the surface of the substrate. The coating may be provided in the form of an ink, varnish or as a polymeric film.

The present invention may provide a polymer composition comprising doped tin oxide wherein less than 50% of the tin atoms in the tin oxide are substituted with a dopant atom.

The polymer composition may comprise a polymer melt or pellets of polymer.

In some embodiments the doped tin oxide forms a printed image or coating on the substrate.

According to a second aspect of the present invention there is provided an ink composition comprising a doped tin oxide wherein less than 50% of the tin atoms in the tin oxide are substituted with a dopant atom.

The doped tin oxide is suitably as defined in relation to the first aspect. The ink composition is suitably a solution or suspension comprising doped tin oxide and one or more further components.

The doped tin oxide is suitably incorporated into the ink composition in the form of a powder. Suitably the powder has an average particle size of less than 1 micron.

In some embodiments the ink composition may be an aqueous composition. In some embodiments the ink composition may be an oleophilic composition. In some embodiments the ink composition may be a solvent based composition.

The selection of an aqueous based ink composition or an oleophilic based ink composition depends on how the ink is intended to be applied to the substrate. The choice of a suitable base ink composition will be within the competence of the person skilled in the art.

The base ink composition may be suitable for any type of printing, for example offset printing (both lithographic and gravure), intaglio printing, letter-press printing, ink-jet printing and screen printing.

Aqueous ink compositions are typically used in screen printing and inkjet printing.

Oleophilic compositions are preferred for offset printing (including lithographic and gravure printing), intaglio printing and letter press printing. They can also be used in inkjet printing.

In inkjet printing the ink composition may have an organic solvent base. Suitable organic solvents include acetone and other ketones, for example methyl ethyl ketone.

For some applications monomer based inks may be used, for example acrylic inks.

Rubber based inks may be used in lithographic, offset, letterpress and screen printing.

In preferred embodiments the ink composition of the present invention is an oleophilic composition.

When the composition is an oleophilic composition the major component of the ink may be an oil, for example linseed oil. Other components typically present in printing inks will be known to the person skilled in the art.

The doped tin oxide is preferably present in the ink composition in an amount of at least 0.1 wt %, preferably at least 1 wt %, more preferably at least 2 wt %, suitably at least 5 wt %.

The doped tin oxide may be present in a composition in an amount of up to 50 wt %, suitably up to 40 wt %, for example up to 30 wt % or up to 25 wt %.

The ink composition may comprise one or more further components for example varnishes, cosolvents, preservatives, drying agents, fragrances, thickeners, waxes and emulsifiers. Other suitable components will be known to the person skilled in the art.

In some embodiments the ink composition may comprise one or more further pigments and/or dyes.

In some embodiments there may be no further pigments or dyes present in the composition.

According to a third aspect of the present invention there is provided a method of manufacturing an article of the first aspect, the method comprising incorporating a doped tin oxide into or onto the substrate.

Preferred features of the third aspect are as defined in relation to the first and second aspects.

In some embodiments the method of the third aspect may include mixing the doped tin oxide into a raw ingredient used to make the substrate and then forming the substrate from the raw ingredient. For example the method of the third aspect may involve dosing doped tin oxide powder into a paper pulp or polymer pellets and then using the pulp or pellets to make the substrate.

The doped tin oxide used in all aspects of the present invention may be prepared by any suitable means. Such means will be known to the person skilled in the art and include for example the methods described in EP173609.

Preferably the method used to prepare the doped tin oxide does not involve a complex method including the steps of milling, grinding and ventilation curing.

In some preferred embodiments the method of the third aspect comprises applying an ink composition comprising doped tin oxide onto a surface of the substrate.

Thus the third aspect of the present invention suitably provides a method of manufacturing an article, preferably a banknote, the method comprising providing a substrate, preferably a substantially planar substrate, and applying to a surface of the substrate an ink composition comprising a doped tin oxide wherein less than 50 mol % of the tin atoms in the tin oxide are substituted with a dopant element.

In preferred embodiments the substrate is a planar substrate, preferably a banknote. The method of the third aspect may involve applying the ink composition to one or both surfaces of the substrate. The ink composition is suitably as defined in relation to the second aspect.

In some embodiments the ink composition may be coated onto the substrate by dipping, spraying, painting or rolling.

In some embodiments the doped tin oxide may be incorporated into a polymer melt composition or other composition which is painted, dipped or sprayed onto the substrate.

The third aspect of the present invention may comprise coating, spraying, dipping, painting or printing onto the surface of the substrate a composition comprising the doped tin oxide.

In some embodiments the tin oxide may be coated onto one surface of the substrate. In some embodiments it may be coated onto both surfaces of a planar substrate. The ink composition may be applied to some or all of the surface or surfaces of the substrate. In some embodiments an image may be applied to the substrate using a printing technique.

In some preferred embodiments the method of the third aspect comprises printing a composition comprising doped tin oxide onto a surface of the substrate.

Any suitable printing technique may be used, for example offset printing (both lithographic and gravure), intaglio printing, letter-press printing, ink-jet printing and screen printing. Preferably the composition is printed by intaglio printing.

Suitably the ink composition is coated or printed onto the substrate at a thickness of at least 1 micron. The thickness will depend on the printing technique used. For offset printing a thickness of 1 to 2 microns is typically used; for a varnish coating or gravure printing a thickness of 2 to 4 microns is preferred; and for intaglio printing a thickness of at least 5 microns, suitably about 8 microns and up to 40 or even up to 80 microns may be used.

The ink composition may be coated or printed onto one or both sides of the substrate.

In some embodiments the ink composition may be provided as an overcoat varnish.

The article of the first aspect of the present invention comprises doped tin oxide incorporated within or, preferably, applied to the surface thereof. The doped tin oxide is suitably an absorber of infra-red radiation and thus the article absorbs infra-red radiation at the locus which carries the doped tin oxide.

Suitably a locus of the surface of the article which carries the doped tin oxide absorbs infra-red radiation. Suitably the locus of the article which carries the doped tin oxide exhibits non-uniform absorption of radiation in the infra-red range. Suitably the locus which carries the doped tin oxide absorbs infra-red radiation at a first wavelength $\lambda_1$ and absorbs infra-red radiation at a second wavelength $\lambda_2$ wherein the absorbance at $\lambda_1$ is different to the absorbance at $\lambda_2$. Preferably the difference in absorbance is at least 1%, preferably at least 2%, more preferably at least 5%.

Suitably $\lambda_1$ and $\lambda_2$ are wavelengths within the infra-red range. Preferably $\lambda_1$ and $\lambda_2$ are each within the range 700 to 2000 nm, preferably within the range 800 to 1800 nm, suitably within the range 900 to 1700 nm, for example within the range 900 to 1600 nm. In some preferred embodiments $\lambda_1$ and $\lambda_2$ are within the range 800 to 1500 nm.

In some preferred embodiments the infrared absorption of the doped tin oxide material increases smoothly over the range 700 nm to 1200 nm, especially over the range 700 nm to 1000 nm. By increases smoothly we mean that the infrared spectrum of the material in this region is preferably a smooth curve or line without any significant peaks.

Suitably the inclusion of the doped tin oxide within or on the surface of the substrate does not substantially alter the colour of the substrate in the visible range.

Suitably the difference in colour between the substrate with and without the doped tin oxide (dE, also referred to as ΔE, dE* and ΔE*) is less than 4, preferably less than 2, more preferably less than 1. The skilled person will appreciate that a dE of less than 1 is generally considered to be imperceptible to the human eye.

Because the presence of the doped tin oxide does not substantially affect the colour of the substrate it may be used to provide a hidden or covert security feature.

In some embodiments the substrate may be printed with two paired inks. Suitably in such embodiments a first portion of the substrate is printed with a first ink composition and a second portion of the substrate is coated with a second ink composition wherein the second ink composition has all of the same components as the first ink composition except that it further comprises a doped tin oxide compound.

Thus the paired inks are suitably identical except for the inclusion of the doped tin oxide.

Suitably the colour difference dE between the first portion of the substrate printed with the first ink composition of the paired inks and the second portion of the substrate printed with the second ink composition of the paired inks is less than 4, the dE is less than 2, more preferably less than 1.

The article, especially when a banknote, may include one or more further security features, for example a UV image/phosphor, an NIR-absorbing image, a holographic feature, a watermark, a thread, a magnetic image, windows, a colour shift/colour change image or a microprinting feature. Further features will also be known to the person skilled in the art.

According to a fourth aspect of the present invention there is provided the use of a doped tin oxide to provide a covert security image or a hidden coating on a banknote, wherein less than 50% of the tin atoms in the tin oxide are substituted with a dopant element.

The doped tin oxides for use in the invention are particularly advantageous for use as covert security features because they have a distinctive and variable absorption in the infra-red region but low absorbance in the visible region of the electromagnetic spectrum. Thus the doped tin oxides used in the invention suitably are not strongly coloured.

The variable infra-red absorption can be used in an authentication method.

According to a fifth aspect of the present invention there is provided a method of detecting a genuine article of the first aspect, the method comprising measuring at a locus on the article the absorption $A_1$ of radiation at a first wavelength $\lambda_1$, and the absorption $A_2$ of radiation at a second wavelength $\lambda_2$, and calculating the ratio of $A_1$ to $A_2$ wherein $\lambda_1$ and $\lambda_2$ are in the infra-red range.

Suitably the ratio of $A_1$ to $A_2$ is compared with a standard and if it matches the standard the article can be determined to be genuine.

In some embodiments the method of the fifth aspect of the present invention may involve measuring the absorbance of radiation at more than two wavelengths. The measurement of further absorbancies allows further ratios to be calculated, providing a higher degree of certainty that an article is authentic.

In especially preferred embodiments $\lambda_1$ and $\lambda_2$ are in the range of 900 to 1800 nm. This allows infra-red radiation to be detected using InGaAs (indium gallium arsenide) detectors. Such detectors are more specialist and less commonly used by counterfeiters than other infra-red detectors which detect at lower wavelengths.

The authentication method of the invention relies on the measurement of the relative absorbance of two different wavelengths on the article (e.g. banknote) at the locus which carries the doped tin oxide. The method determines the relative absorption at two different wavelengths and suitably compares this with a standard, and can be carried out on a large scale.

For example multiple banknotes per second can be passed through a detector and the relative absorption ratio compared with the standard in an automated process.

The authentification method of the fifth aspect of the invention may find utility in a number of applications. For example a handheld device able to authenticate a single banknote at a time could be provided for use by small traders; a countertop device capable of evaluating multiple banknotes in an automatic method could be provided for use in a bureau de change or a vending machine; a device which validates individual notes as they are dispensed in an ATM could be provided; or equipment able to rapidly authenticate large numbers of notes, for example high speed note sorting.

Preferably the article of the first aspect is a banknote. Preferably it has a coating comprising doped tin oxide or is printed with an image comprising doped tin oxide. Suitably the doped tin oxide coating or image is durable to heat, light, water, chemicals and mechanical impact, abrasion and wear and tear. Suitably the coating or image is durable to laundering and to UV light from sunlight.

However all banknotes and other articles will become worn over time, and the quality of the doped tin oxide coating or image may deteriorate. As the absorption of the coating/image depends on the concentration of the doped tin oxide this may change as a banknote is worn. Thus measurement of the absorption at a locus of the banknote or other article may provide an indication of the quality of the article. The present invention may therefore provide a screening method to detect inferior banknotes or other articles.

According to a sixth aspect of the present invention there is provided a method of assessing the quality of an article of the first aspect, the method comprising measuring at a locus of the article which carries a coating or an image of doped tin oxide, the absorption $A_1$ of at least one wavelength of $\lambda_1$ of radiation in the infra-red range and comparing the absorption with a known standard.

Suitably the method of the sixth aspect involves further measuring at the locus of the article which carries a coating or image of indium tin oxide the absorption $A_2$ of a second wavelength $\lambda_2$ of radiation in the infra-red range, calculating the ratio of $A_1$ to $A_2$ and comparing this with a known standard.

The method of the sixth aspect may be used to provide an automatic screening method. For example the infra-red absorption $A_1$ and $A_2$ of banknotes can be measured and compared with a standard in an automated system. Banknotes which conform closely with the standard ratio can be redistributed whereas those on which the image has deteriorated can be withdrawn from circulation.

The invention will now be further described with reference to the following non-limiting examples.

EXAMPLE 1

The infrared spectrum of an antimony doped tin oxide powder comprising 5 mol % antimony was recorded. This is shown in FIG. 1.

A blue ink composition and a yellow ink composition were prepared comprising 20 wt % of the antimony doped tin oxide (containing 5 mol % antimony) in an oleophilic base ink composition.

The composition was printed by to a thickness of 8 microns onto banknote paper by intaglio printing. The infrared spectra of the prints were recorded.

Figure 2:
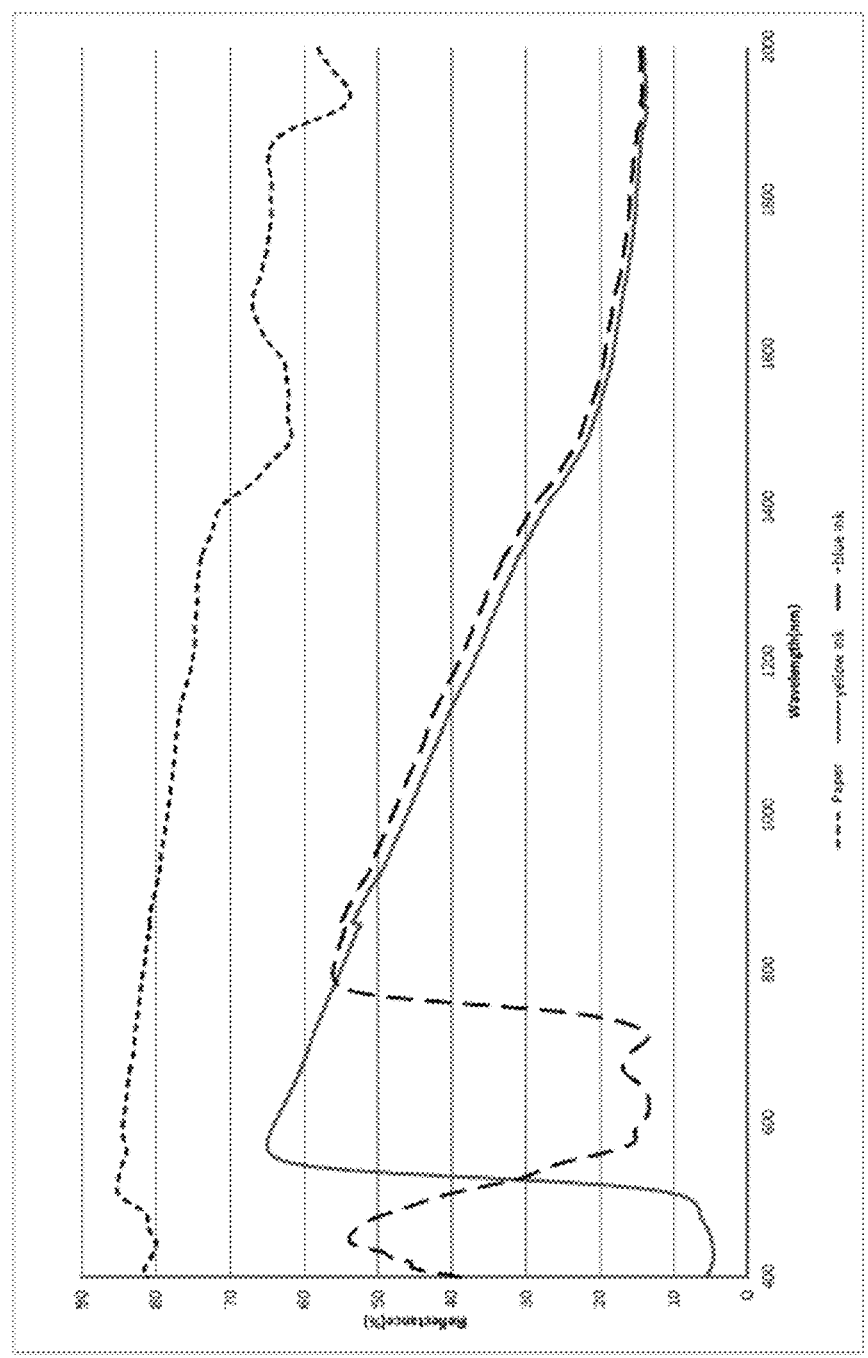
FIG. 2 shows the infrared spectrum of blue and yellow prints employing the antimony doped tin oxide with that of a blank piece of paper.

FIG. 2 shows the infrared spectrum of the blue and yellow prints compared with that of a blank piece of paper.

Figure 3:
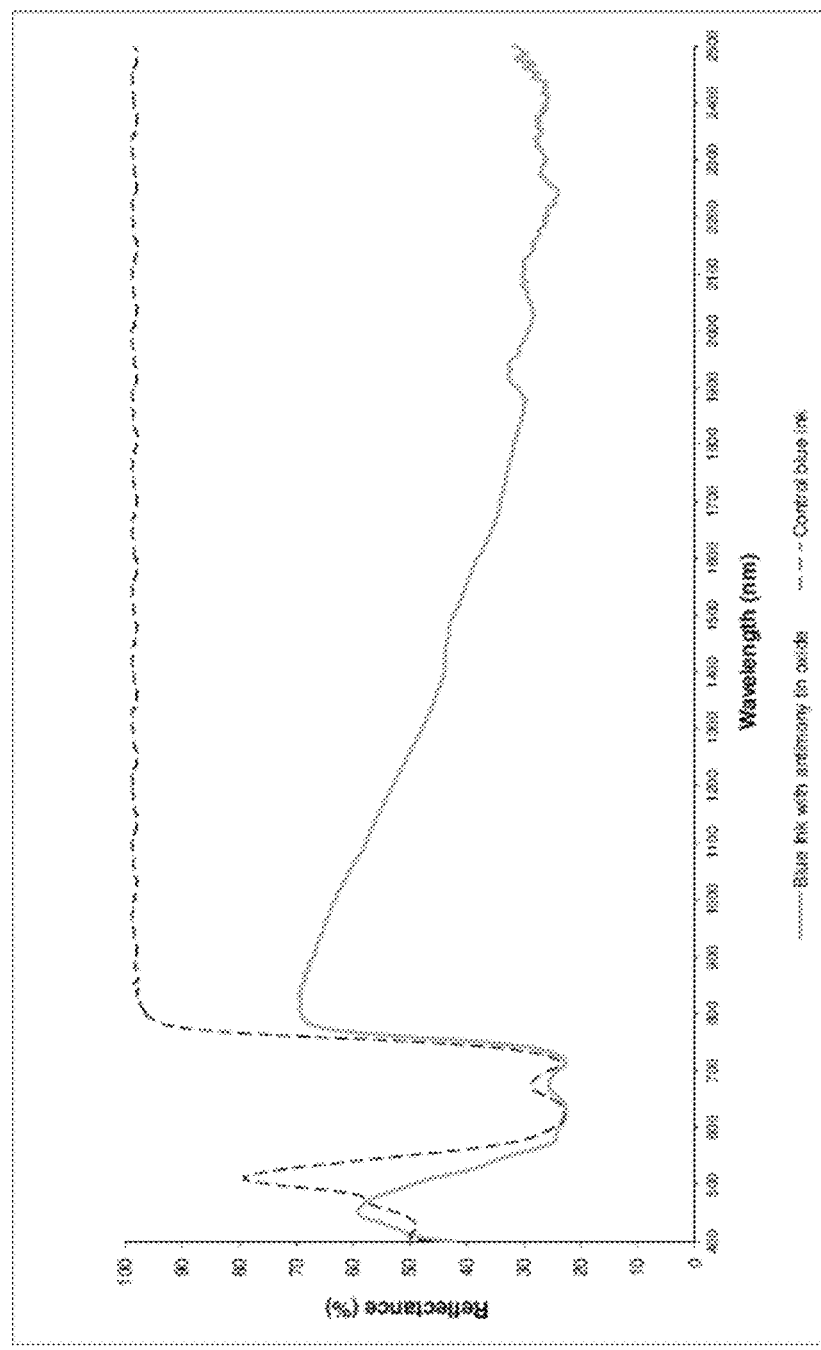
FIG. 3 shows the infrared spectrum of the blue print and an equivalent blue print without antimony doped tin oxide.

FIG. 3 shows the infrared spectrum of the blue print and an equivalent blue print without the antimony doped tin oxide.

EXAMPLE 2

An ink composition was prepared comprising 20 wt % of antimony doped tin oxide (containing 5 mol % antimony) in an oleophilic base ink composition.

The composition was printed by intaglio to a thickness of 8 microns onto banknote paper. The infrared spectrum of the print was recorded.

The chemical resistance of the article was tested by immersing in each of sodium hydroxide, tetrachloroethane, xylene and hydrochloric acid for 30 minutes. The article was dried and then the infrared spectrum was remeasured. The results shown in FIG. 4 demonstrate that the image was resistant to the chemicals used in the test.

EXAMPLE 3

An ink composition was prepared comprising 20 wt % of antimony doped tin oxide (containing 5 mol % antimony) in an oleophilic base ink composition.

The composition was printed by intaglio to a thickness of 8 microns onto banknote paper. The infrared spectrum of the print was recorded.

Figure 4:
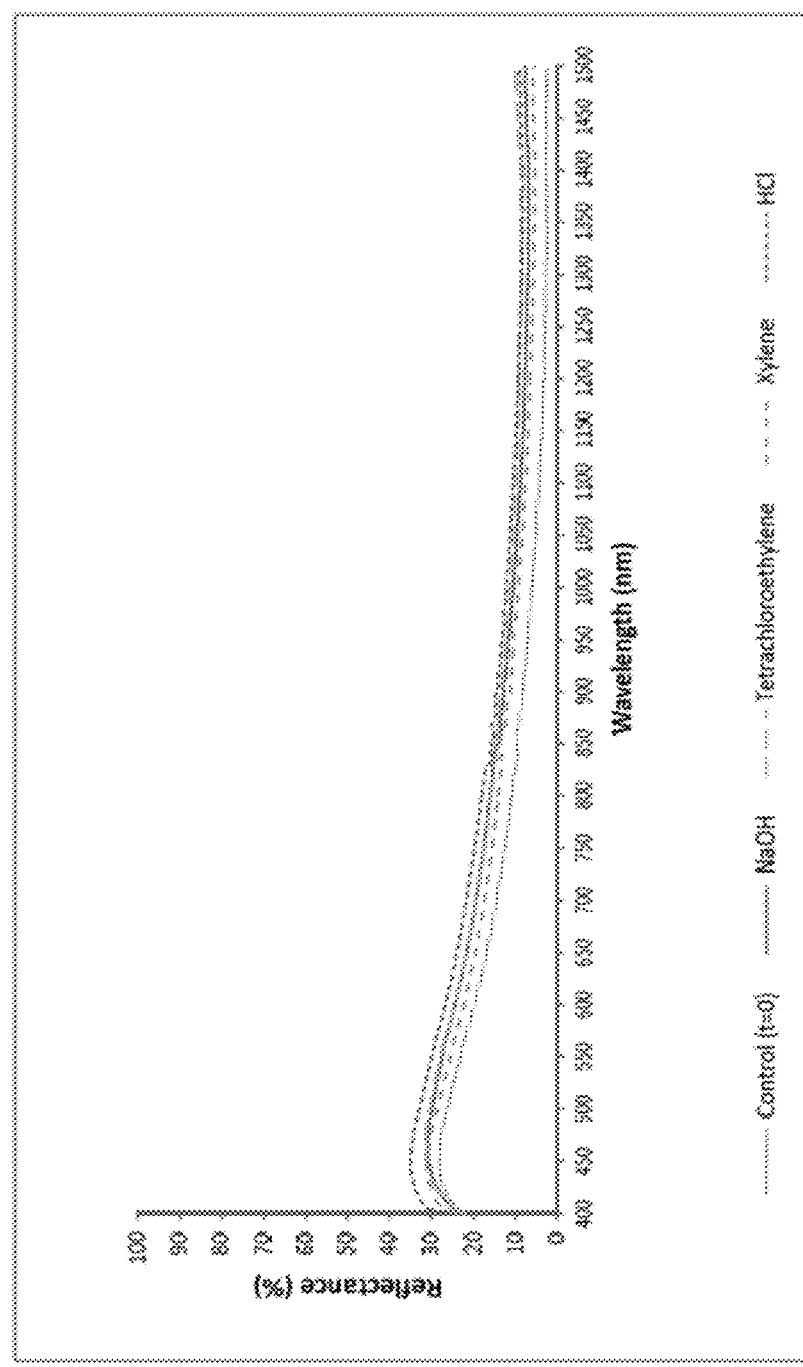
FIG. 4 shows the results of chemical resistance testing of articles according to embodiments of the invention.
Figure 5:
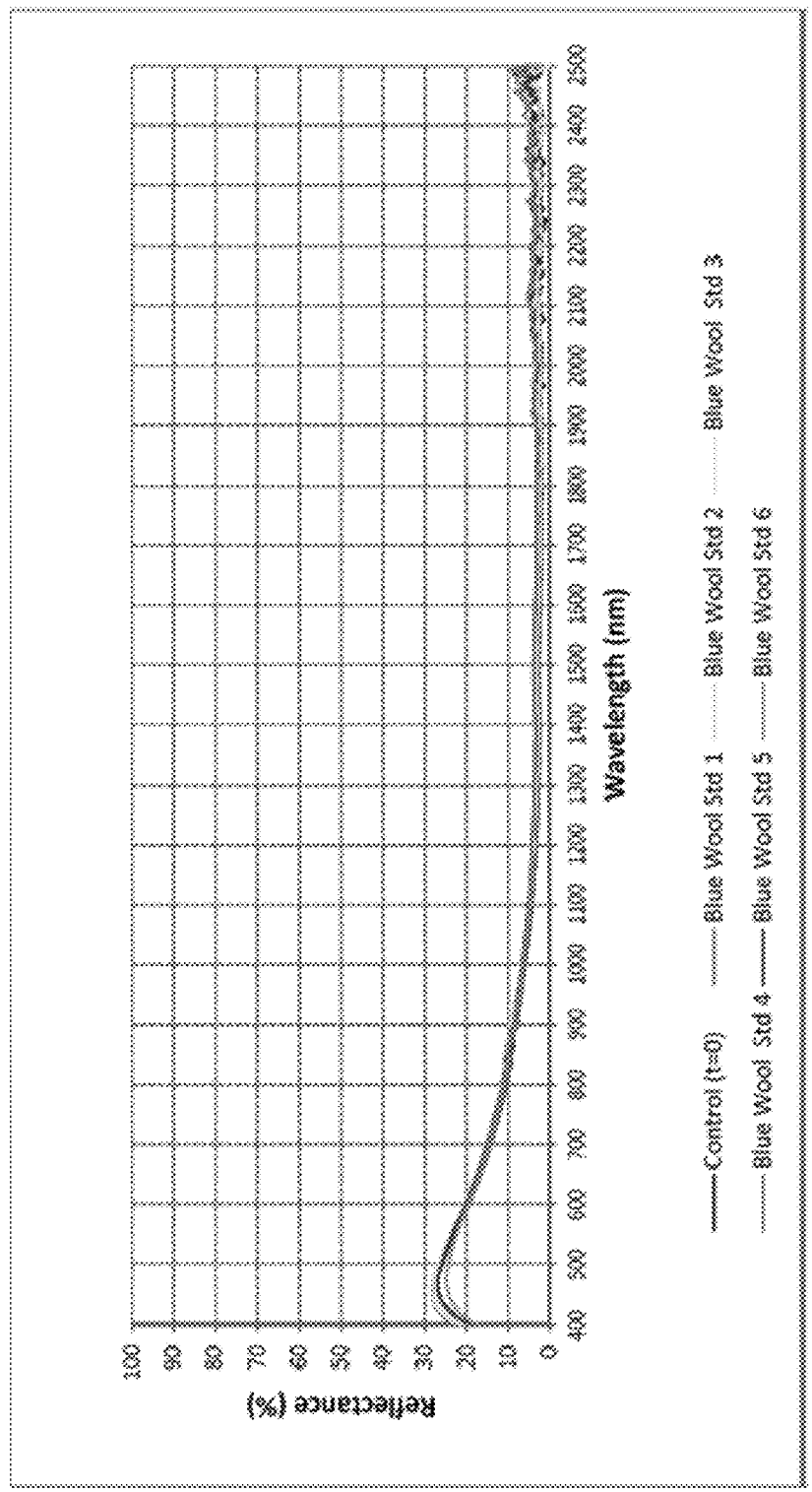
FIG. 5 shows the results of light fastness testing of articles according to embodiments of the invention.

The light fastness of the article was tested by exposing it to light equivalent to the standard blue wool scale. Standards are dyed with fugitive to light-stable dyes—standard 1 being a dye of very poor photo-stability and standard 8 being dyed with a blue dye of exceptional photo-stability. For banknotes a minimum rating of Blue scale 3 is required. As the results in FIG. 4 show, the prints of the present invention were still stable when exposed to light for a long time—sufficient to fade Blue Standard 6. This means that the light-stability is excellent.

EXAMPLE 4

Figure 6:
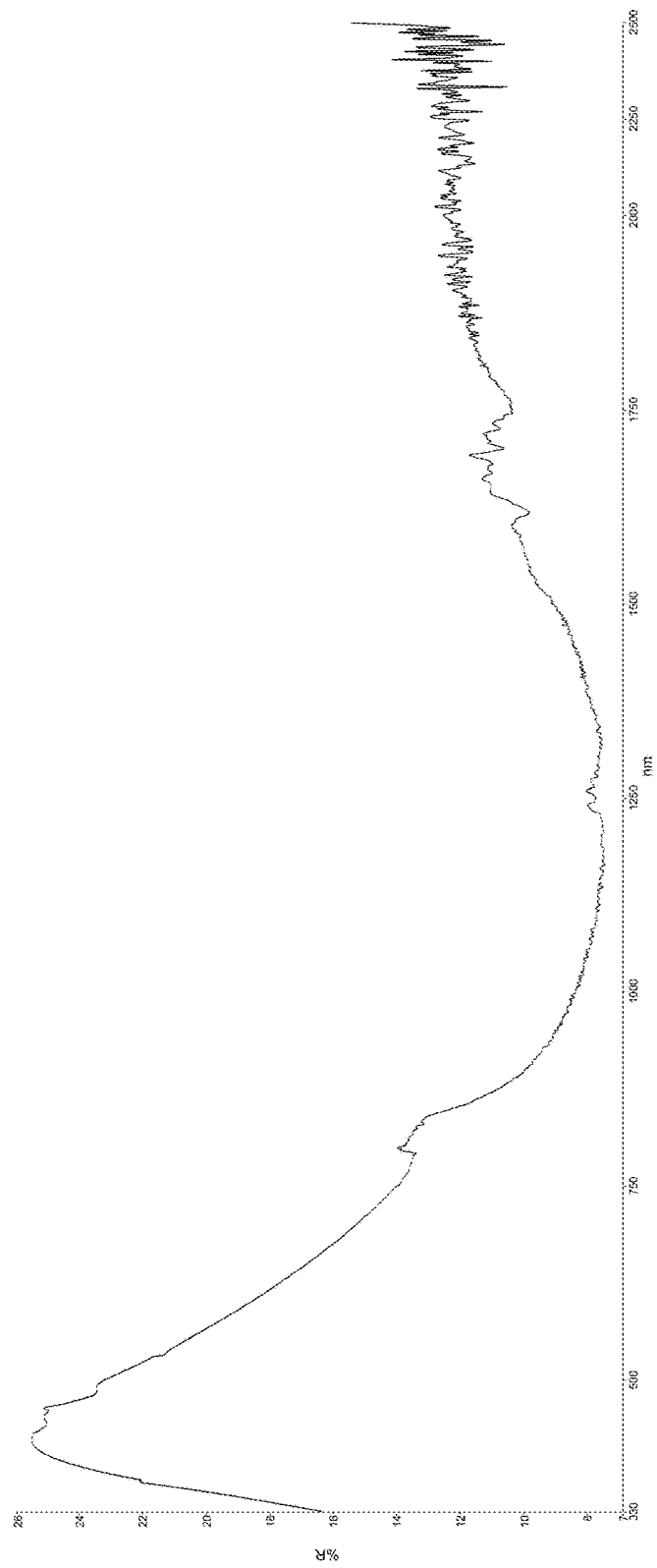
FIG. 6 shows the infrared spectrum of an antimony doped tin oxide powder comprising 10 mo % antimony.

The infrared spectrum of an antimony doped tin oxide powder comprising 10 mol % antimony was recorded. The results are shown in FIG. 6.

Figure 7:
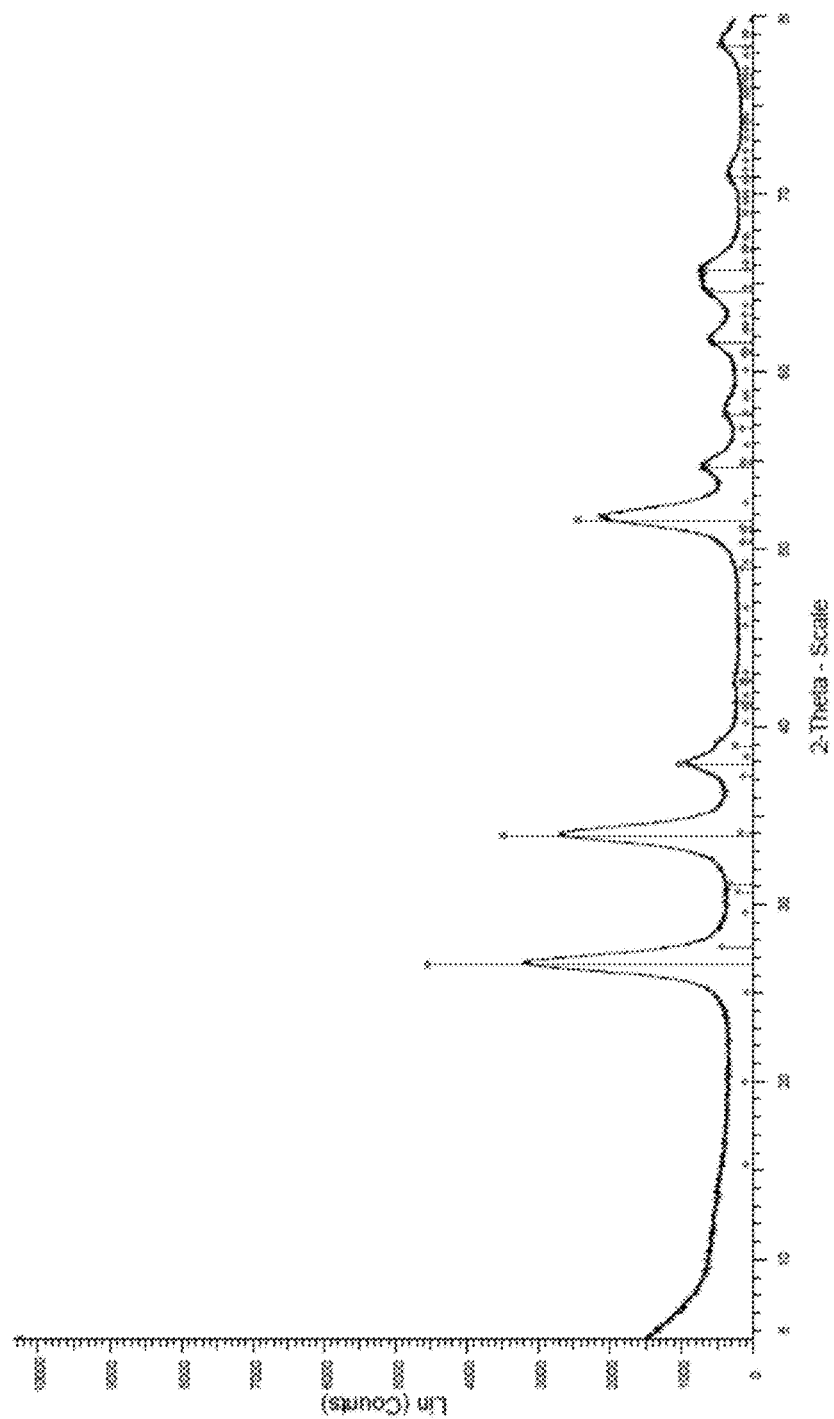
FIG. 7 shows the X-ray diffraction spectrum of the powder of FIG. 6.

The Xray diffraction spectrum of this powder was also recorded and is shown in FIG. 7.

EXAMPLE 5

The material of example 4 was incorporated into blue and yellow intaglio inks at the following concentrations:

| Composition | Ink colour | Concentration of antimony doped tin oxide (%) |
| --- | --- | --- |
| 1 | yellow | 20 |
| 2 | yellow | 41.5 |
| 3 | blue | 20 |

Figure 8:
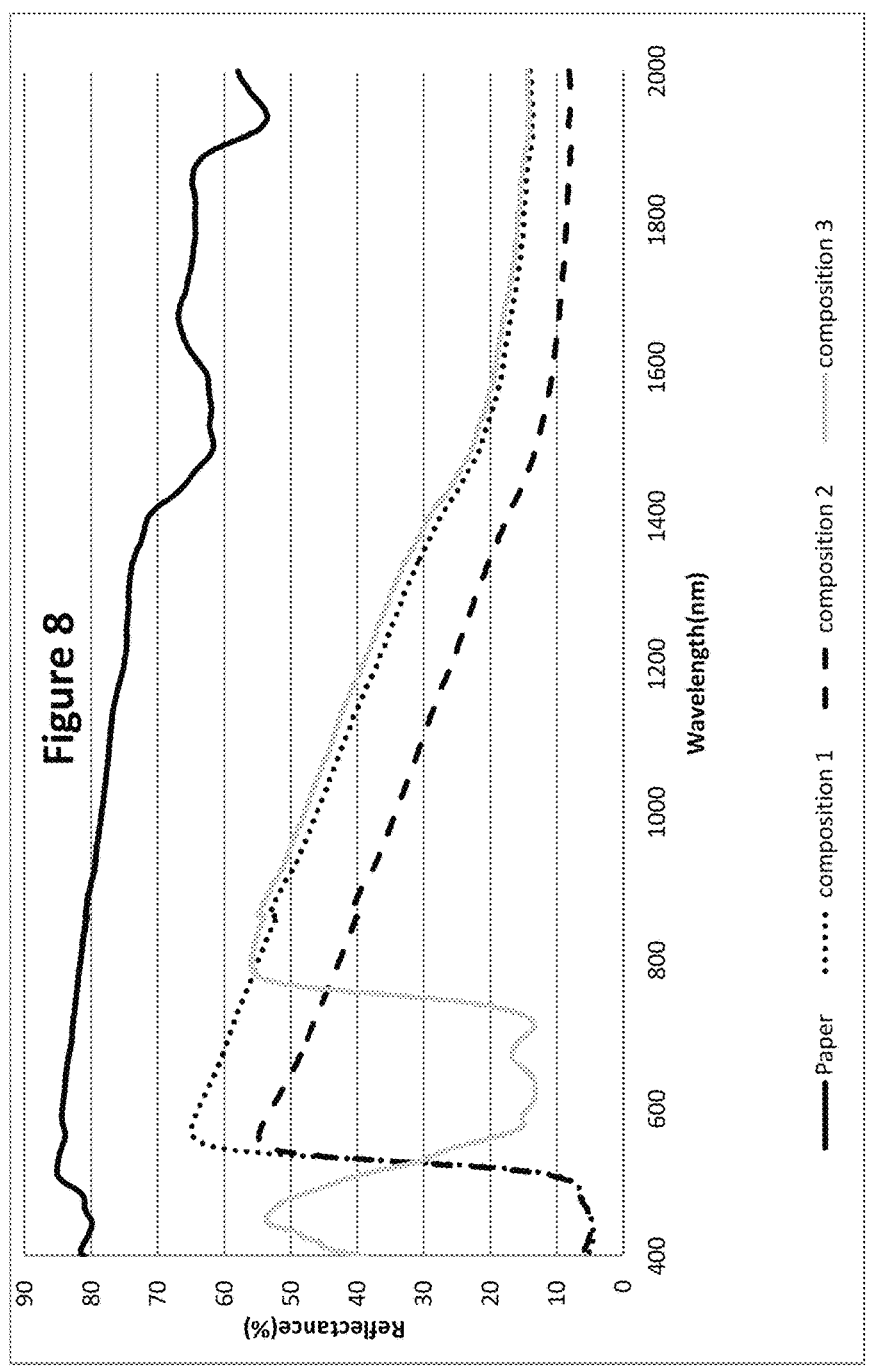
FIG. 8 shows infrared spectra of prints according to embodiments of the invention.

These inks were printed at a thinkness of approximately 8 microns and the infrared spectra of the resultant prints were recorded. The results are shown in FIG. 8.

EXAMPLE 6

Figure 9:
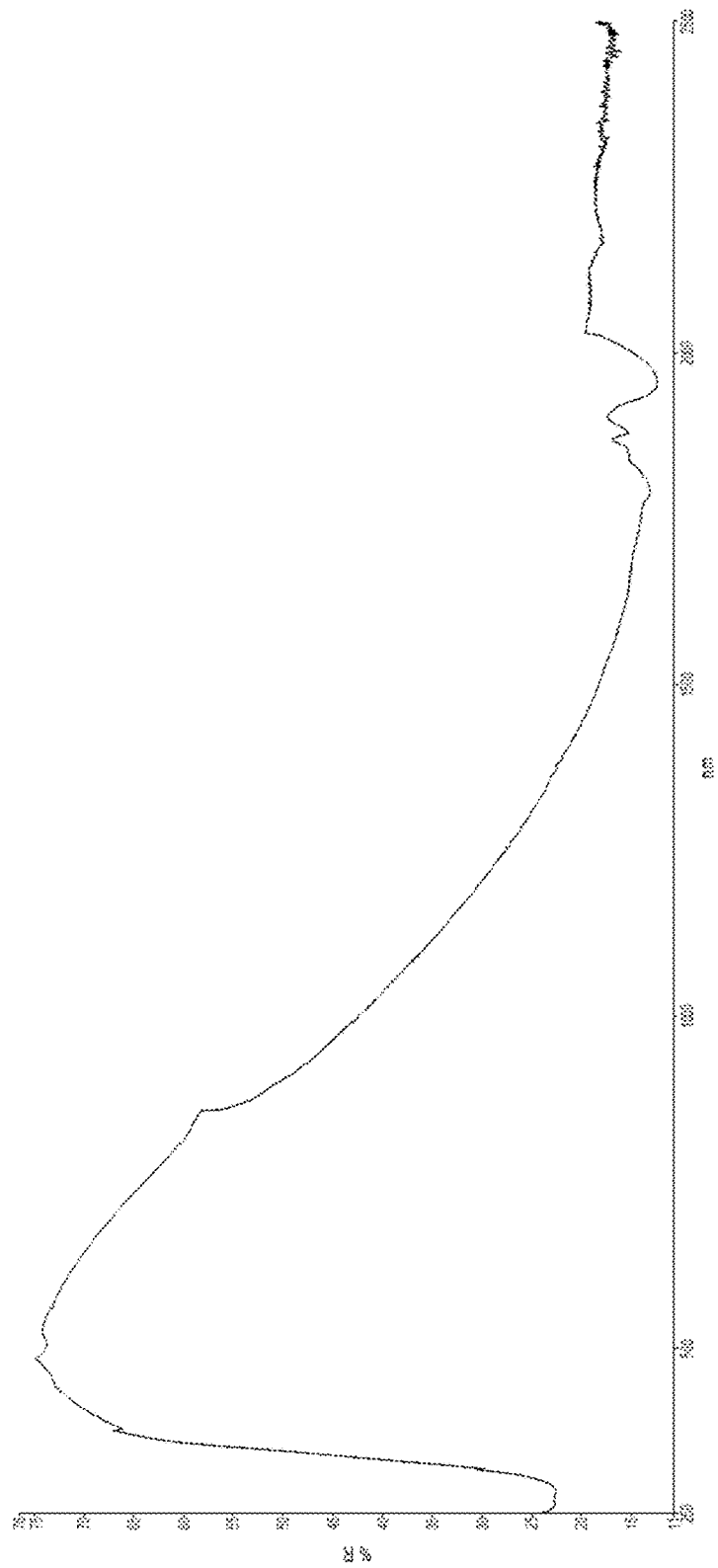
FIG. 9 shows the infrared spectrum of a fluorine doped tin oxide powder comprising 1.5 mol % fluorine.

The infrared spectrum of a fluorine doped tin oxide powder (comprising 1.5 mol % fluorine) was recorded and is shown in FIG. 9.

The invention claimed is:

1. A method of detecting a genuine article, the article comprising a substrate which carries a doped tin oxide, wherein less than 50 mol % of tin atoms in the tin oxide are substituted with a dopant element, the method comprising:
   measuring at a locus on the article an absorption $A_1$ of radiation at a first wavelength $\lambda_1$ and an absorption $A_2$ of radiation at a second wavelength $\lambda_2$; and
   calculating a ratio of $A_1$ to $A_2$ wherein $\lambda_1$ and $\lambda_2$ are between 900 nm and 1800 nm; and
   comparing the calculated ratio of $A_1$ to $A_2$ with an absorption ratio of an article known to be genuine and, if the calculated ratio matches the absorption ratio, the article can be determined to be genuine,
   wherein the tin oxide is doped with one or more elements selected from a group consisting of: antimony, tungsten, fluoride, and phosphorus.

2. A method according to claim 1, wherein the article is a banknote.

3. A method according to claim 1 wherein a difference in colour (dE) between a locus of the substrate with the doped tin oxide and a locus of the substrate without the doped tin oxide is less than 2.

4. A method according to claim 1 wherein the locus of the article exhibits a non-uniform absorption of radiation.

5. The method of claim 1, wherein the absorbance at $\lambda_1$ and the absorbance at $\lambda_2$ are different.

6. The method of claim 1, wherein the article is a banknote comprising a covert security image or a hidden coating.

7. The method of claim 1, wherein measuring includes detecting infrared radiation using an InGaAs detector.

\* \* \* \* \*